April 19, 1966  A. C. RUGE  3,246,510
NON-LINEARITY COMPENSATION MEANS FOR ELECTRICAL
STRAIN GAGE TRANSDUCER
Filed May 1, 1961  2 Sheets-Sheet 1

INVENTOR.
Arthur C. Ruge
BY
Attorney

April 19, 1966  A. C. RUGE  3,246,510
NON-LINEARITY COMPENSATION MEANS FOR ELECTRICAL
STRAIN GAGE TRANSDUCER
Filed May 1, 1961

INVENTOR.
Arthur C. Ruge
BY
Attorney

United States Patent Office 3,246,510
Patented Apr. 19, 1966

3,246,510
NON-LINEARITY COMPENSATION MEANS FOR ELECTRICAL STRAIN GAGE TRANSDUCER
Arthur C. Ruge, Lexington, Mass., assignor to Baldwin-Lima-Hamilton Corporation, a corporation of Pennsylvania
Filed May 1, 1961, Ser. No. 106,604
4 Claims. (Cl. 73—141)

This invention relates to transducers of the so-called strain gage type in which the phenomenon to be transduced manifests itself in the form of elastic deformations or strains, the deformation or strains being converted into an electrical signal by means of an electrical strain gage which may depend upon any of the well-known strain gage principles such as the bonded or unbonded resistance filament strain gage, electro-magnetic gages of all types, capacitance gages, variable reluctance gages, etc. More particularly, this invention relates to such strain gage transducers which involve at least two electrical strain gages which respond to the phenomenon to be transduced in different sign senses. Thus, if resistance type strain gages are used, one strain gage in the transducer increases resistance while the other decreases resistance in response to the phenomenon to be measured.

Present-day transducer art has progressed to such a point of refinement that, in addition to high accuracy and precision of response, more and more stress is being placed upon obtaining an extremely high degree of linearity between transducer output and the phenomenon being transduced. By way of example of current art, bonded resistance wire strain gage type of transducers for measuring load are being built today to give a maximum non-linearity of output versus load of as little as 1/60% of full scale anywhere from zero to full-scale load. However, to achieve this remarkable degree of linearity in a production item would require an unreasonable amount of selection and rework which introduces serious production delays and is very costly. In this advanced current art it is quite practical however to manufacture such devices to a linearity tolerance of ±1/20% of full scale as economical production items.

An object of my invention is to provide improved means of further reducing the above manufacturing tolerance in a very economical way which does not involve selection or rework.

Although this invention, as stated above, relates to any type of strain gage transducer of the class defined in the first paragraph, the description herein will for purposes of conciseness and clarity be largely confined to the bonded wire strain gage type of transducer for measuring load, it being understood that the same principles apply in transducers involving other kinds of electrical strain gages and in transducers for measuring other quantities such as fluid pressure, torque, acceleration, etc.

Other objects and advantages will be more apparent to those skilled in the art from the following description of the accompanying drawings in which.

While there are a number of factors contributing to the non-linearity of a strain-gage type transducer, there are three principal factors, one or more of which normally play a part in determining the non-linearity of a well-built and well-designed strain gage transducer. These are: (1) non-linearity in the stress-strain relationship of the elastic medium transducing the phenomenon into strain or deformation; (2) non-linearity introduced as a result of changes of the geometry of the transducer as it responds to the phenomenon; (3) non-linearity of the electrical strain gage which transduces the strains or deformations into electrical signals. In the modern art, all three of these factors are indeed small; however, when very high accuracy devices are involved they are definitely measurable and undesirable. Fortunately, in a well-built and well-designed transducer and strain gage combination these three factors, and probably a number of other lesser ones, are normally of such nature that they can be compensated to a marked degree by means of my present invention. Perhaps the greatest advantage of this invention is that it comprises a compensation which is effected after the transducer is substantially completed so that all factors affecting its linearity are corrected for in one operation. Furthermore, the present invention makes it possible to compensate for the unavoidable variations in non-linearity occurring among individual transducers of a production run at very moderate cost.

Figure 6:
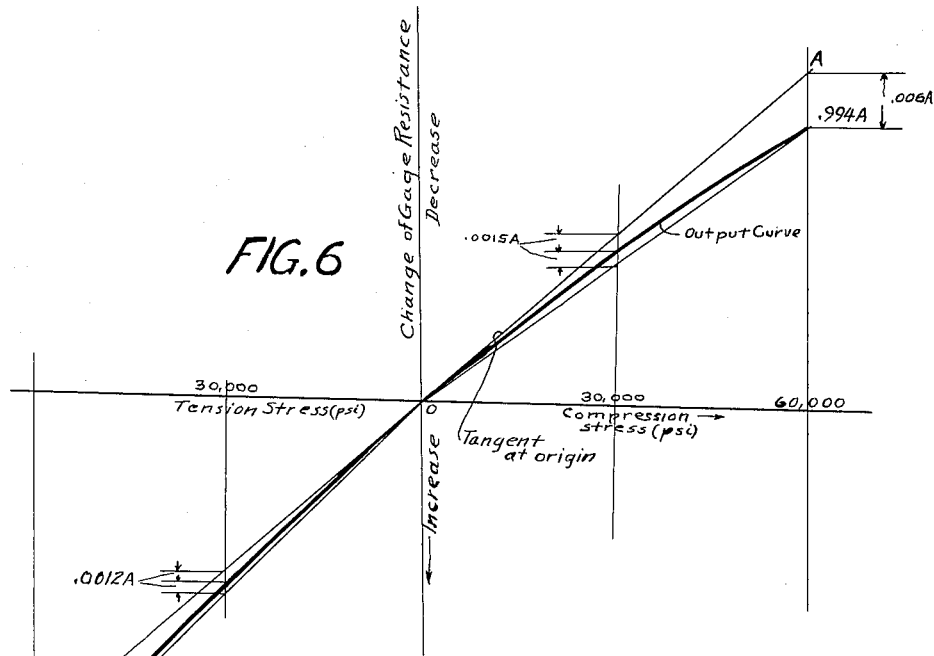
FIG. 6 illustrates the non-linearity of change of resistance of a bonded filament gage versus stress.

To further simplify and shorten this disclosure, attention will be largely focused upon the first-nonlinearity factor mentioned above; namely, non-linearity of the stress-strain relationship of the elastic material used to transduce the phenomenon into a strain or deformation. While the stress-strain relationship of highly elastic materials such as tool steels, beryllium copper, etc., is usually thought of as being perfectly linear, close examination reveals that this is not the case and that the modulus of elasticity of all commonly-used transducer materials varies somewhat with magnitude and sign of the stress. Furthermore, the nature of this variation in the Young's modulus of normal elastic materials is such that the modulus progressively increases with increasing stress in compression, while it progressively decreases with increasing stress in tension. The deviation of the stress-strain curve in both directions of loading from a tangent drawn at the origin is illustrated in FIG. 6 which shows the effect of load on an element such as 1 of FIG. 1 as manifested by the change in resistance of gage 2, being very closely parabolic in form; i.e., the deviations from the tangent vary substantially as the square or the stress.

Figure 1:
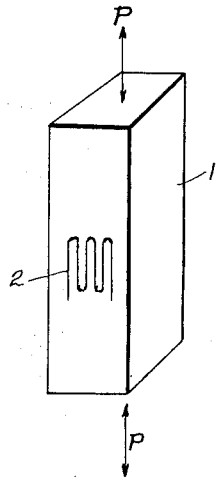
FIG. 1 is a diagrammatic perspective of a force-responsive strain-sensitive element of a transducer.

Referring to FIG. 1 a specimen 1 of an elastic material, say tool steel, in the form of a rod is subjected to axial stress in either tension or compression, as indicated by the arrows. If I apply to the specimen an electrical strain gage 2 which may for purposes of illustration be a bonded filament resistance strain gage, very careful measurement of the change of resistance of gage 2 versus stress results in a curve such as shown in FIG. 6 which is based on actual experience with certain grades of tool steel combined with the bonded filament strain gage. It is important to note that the non-linearity of change of resistance versus stress illustrated in FIG. 6 is shown to a tremendously exaggerated scale. The tangent at the origin is drawn as a reference line A-O-A from which the non-linear deviations can be plotted in greatly magnified detail. A typical result is that the difference between the tension and compression resistance changes at 60,000 p.s.i. stress is $$.006A + .0048A = .0108A$$

which amounts to 1.1% of the full scale output in either direction. It is further seen that the maximum deviation of the curve from a chord joining the origin and full-stress point is .0015A in compression and .0012A in tension, or .15% and .12% of full scale output respectively, the curve having a higher value than the chord at mid-scale in compression and a lower value in tension.

Figure 2:
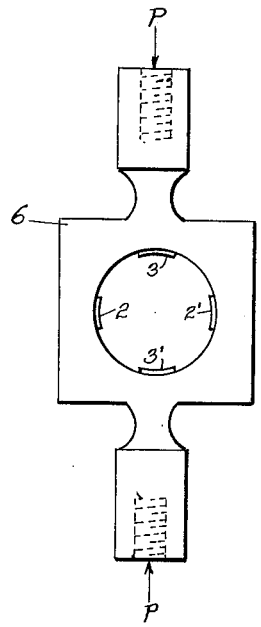
FIG. 2 is a front elevation of a so-called square "ring" type of sensitive element.
Figure 3:
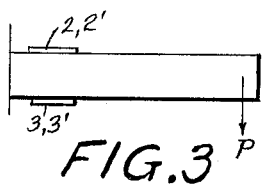
FIG. 3 is a side elevation of a bending beam type of sensitive element.
Figure 4:
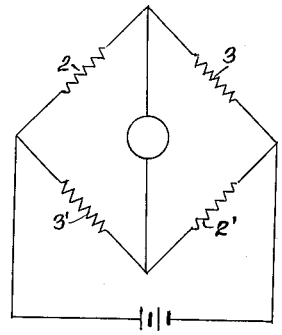
FIG. 4 is a diagram of a usual strain gage bridge.

Consider now a load transducer 6 illustrated in FIG. 2 which is of the type disclosed in my Patent No. 2,561,318. This is a good illustrative example of the type of transducer in which at least two electrical strain gages 2, 3 respond in opposite sign senses to an applied load P, gage 2 going into compression and gage 3 into tension as a result of application of a compressive load P to the element. As a practical matter, normally two other gages 2', 3', are used for added output and symmetry, and the four gages are connected into a bridge circuit as illustrated in FIG. 4 where it will be seen that the effects of the four gages are cumulative in producing unbalance of the bridge in response to load. Another example out of many which could be given is the simple cantilever type of load transducer, FIG. 3, where strain gages 2, 2' go into tension and gage 3, 3' go into compression as a result of application of load P, again being connected as shown in FIG. 4. And, of course, addition of a transverse gage to the element 1 of FIG. 1 produces the same situation except that here the strain in the gage is determined entirely by the Poisson effect. Examples of fluid pressure transducers, torque transducers, and many others could be given in which at least two strain gages react in opposite sign senses in response to the phenomenon, as is well-known in the art.

Figure 7:
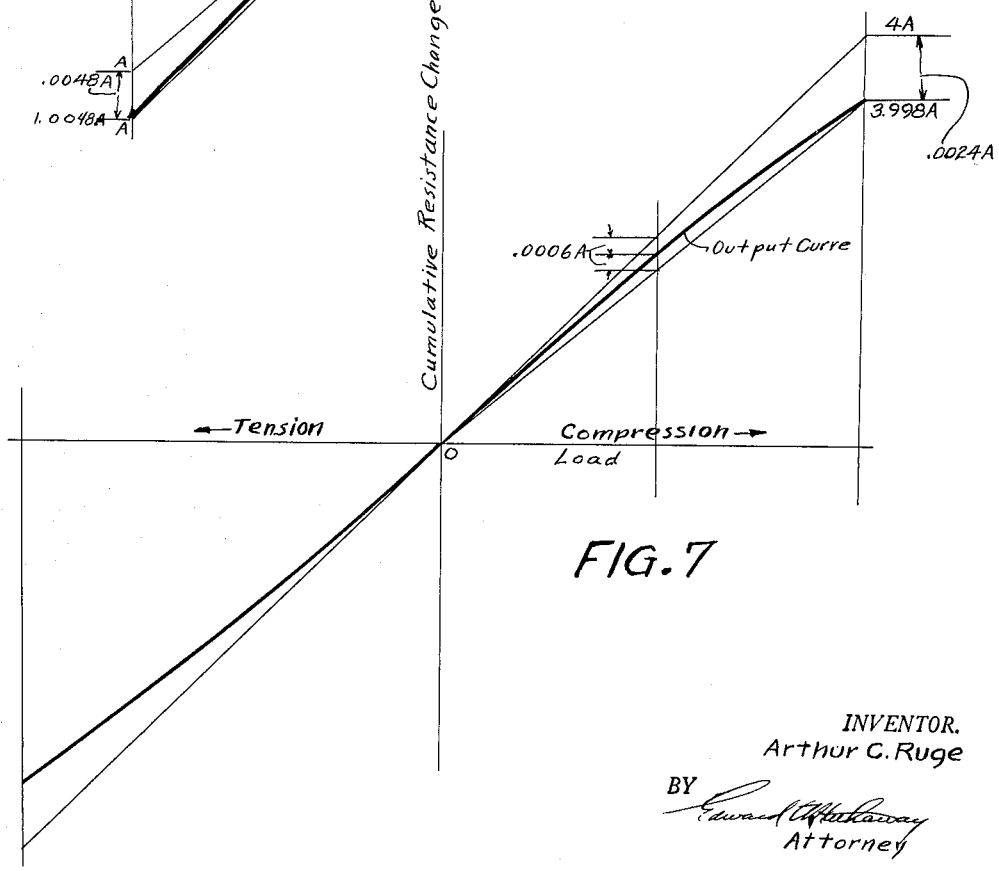
FIG. 7 is derived from FIG. 6 and illustrates the non-linearity of a transducer having two gages stressed in tension and two gages equally stressed in compression.

Assuming the transducer element 6 is made of the same material as 1 of FIG. 1 and that the same kind of strain gage is used in both cases, it will be seen that the circuit of FIG. 4 will result in a bridge unbalance proportional to the cumulative resistance changes of the four gages, and if at full load P the stress at the gages is 60,000 pounds, we can then construct FIG. 7 from FIG. 6 by simply adding the tension and compression resistance changes of the four gages, treating all changes as positive in accordance with the action of FIG. 4 circuit. Since there are two compression and two tension gages, we arrived at the full-scale cumulative change equal to $2(.994A + 1.0048A) = 3.998A$. The deviation of the curve from the tangent at origin at midscale is found by calculating $2(.0015A - .0012A) = 0006A$. Since this is a parabolic deviation, the midpoint deviation of the curve from the chord joining the origin and fullscale output will also be .0006A. Note that the curve of FIG. 7 is S-shaped in contrast to the uniformly convex shape of the curve of FIG. 6. This means that the tension and compression outputs for a given load will be substantially equal instead of differing by 1.1% as in the case illustrated in FIG. 6.

From this discussion it will be seen that a combination of equal tension and compression strains results in a marked reduction in the non-linearity which would be produced by either tension or compression strain alone. This is analagous to the familiar push-pull operation of many electronic circuits which linearize vacuum tube output in much the same way. It can be seen that, theoretically at least, by properly designing the ratio of tension to compression strains in an element such as that of FIG. 2 it is possible to reduce the non-linearity to an arbitrarily small amount.

As mentioned earlier, other factors enter into the non-linearity in practice, and the optimum ratio of tension to compression strain has to be determined experimentally as the design of a given transducer progresses. In the case of the ring-type load element shown in FIG. 2, it is easy to visualize that there are changes in the geometry of the structure as it responds to load, the circular hole changing to a horizontal ellipse for a compression load and a vertical ellipse for tension; it may be seen that this results in a non-linearity of output similar in character to that shown in FIG 6 but with the curvature of the response curve opposite in sign; that is, with increasing compressive load the horizontal diameter of the hole progressively increases with the result that the non-linearity so induced tends to compensate for (or over-compensate for) the non-linearity due to the variation of Young's modulus illustrated in FIG. 6. Furthermore, the electrical strain gage, of whatever type, normally exhibits a certain degree of non-linearity of its own and, depending upon the type and construction of the electrical strain gage, this non-linearity may or may not be in the direction to compensate against the elastic effect illustrated in FIG. 6. Another source of a small degree of non-linearity of similar character arises from the elastic action of the supporting structure associated with a transducer element such as that of FIG. 2. For example, in my Patent No. 2,561,318, FIGS. 1 and 2, diaphragms 11 and 12 which serve to support the load sensing element introduce a small constraint against the axial deflection of the element under load. In practice, it is found that this constraint is not perfect linear with load and if the diaphragms are not initially perfecty flat and free of locked-in stresses, the non-linearity of the constraint action may be sufficient to be quite noticeable in a precision type of load cell.

Now, if all of these and other non-linear factors were absolutely reproducible from cell to cell in a production model, it would be at least possible to so proportion the various parts of the design as to arrive at substantially perfect linearity in the finished product. Unfortunately, however, this is not the case and practical experience shows that, however carefully the design is made and the work is done, there will be a certain amount of uncontrollable scatter in the non-linearity of unselected production load cells. This appears to result from a number of causes such as metallurgical differences between individual load sensing elements as to heat treatment, chemical composition, etc., which give rise to slightly differing stress-strain curves; there is a certain amount of scatter in the inherent non-linearity of the electrical strain gages, probably due to such factors as slight variation in material and workmanship; and there is known to be considerable variation in the magnitude and non-linearlity of the constraints of the supporting structure discussed above, due to lack of flatness of the diaphragms, existence of tension or compression stresses in the diaphragms, etc. It is with the unavoidable residual non-linearity which the present invention is primarily concerned since it provides a means to alter or compensate for non-linearity after the transducer has been substantially completed. How this is done is illustrated in FIG. 5 which shows a bridge circuit embodying strain gages 2, 2', 3, 3', of FIG. 2 as the load sensing element, it being assumed that when these same gages are connected as shown in FIG. 4 a certain degree of non-linear performance is exhibited, this non-linear performance being of or having a component of character similar to that illustrated in FIG. 7, in which the response of the transducer deviates from a tangent at the origin in progressive fashion, either progressively dropping below the tangent or progressively rising above it as the transduced condition increases in magnitude.

Figure 5:
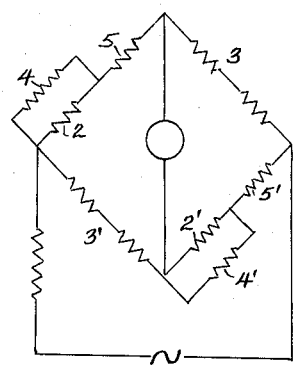
FIG. 5 is a diagram of such a bridge with improved circuitry added.

If we assume for the sake of illustration that the output of FIG. 4 results in the characteristic shown in FIG. 7, and if we modify FIG. 4 as shown in FIG. 5 by reducing the contribution of strain gages 2 and/or 2' with shunts, series resistors, or both, we can obtain a differential compensating effect upon the linearity of the device.

Although the discussion has been centered about a specific embodiment involving bonded filament strain gages and a load-sensing element of particular design, this invention is by no means limited to embodiments of this class. It is sufficient to point out that the same principle is applicable to many other types of transducers such as are employed for the measurement of fluid pressure, torque, acceleration, etc., and that other types of electrical strain gages may be employed within the scope of the present invention. It is further worthy of note that my invention may be employed to produce a deliberate amount of non-linearity, or to adjust the non-linearity to a given degree, as well as to compensate against inherent non-linearity of the transducer.

It may be seen that, broadly, I provide in this invention condition-responsive apparatus having a condition-responsive network (such as the bridge of FIG. 5) which in turn has two input and two output terminals and which includes two condition-responsive electrical impedance elements (such as 2, 3, FIGS. 2, 3, and 5), one of which increases in impedance for an increase in the condition to be measured (in this case, a load P) and the other of which decreases in impedance for an increase in the same condition to be measured. It is of course necessary for the impedances of the two elements to be compatible with each other, as is well known to the art of condition-responsive electrical network design. These two impedance elements exhibit non-linear condition responses and the extent of such non-linearities differs between the two (as illustrated by the differing tension and compression responses of a strain gage and a load transducer, FIG. 6). The voltage appearing across the output terminals when a suitable power source is applied to the input terminals is a function of the algebraic difference of the condition responses of the two impedance elements, the algebraic signs of such responses being taken to be opposite to each other for a given condition. Thus, in FIG. 5, the net result of such algebraic difference of the responses of 2 and 3 is to produce a cumulative or additive effect upon the bridge output.

Now, in order to effect a desired variation in the condition-response of the apparatus as a function of the condition itself, I provide means (4 and/or 5 in FIG. 5) whereby the contribution of one element (2) to the total condition-responsive output is reduced, thereby affecting the linearity of the condition-response of the apparatus. In other words, in this illustration I employ the effect of the load itself upon element 2 to affect the linearity of the relationship between load and output of the apparatus.

It will, of course, be understood that various changes in details of construction and arrangement of parts may be made by those skilled in the art without departing from the spirit of the invention as set forth in the appended claims.

I claim:

1. Condition-responsive apparatus having its condition response varied to a desired degree as a function of the magnitude of the condition itself, so as to affect the linearity of its condition response comprising, in combination, an electrical network including a first electrical impedance element whose impedance increases non-linearly to a given extent in response to an increase of the condition to be measured, a second electrical impedance element whose impedance decreases non-linearly to a different extent in response to an increase of said condition to be measured, said network having two input and two output terminals, a source of voltage impressed upon said input terminals, and means electrically connecting said first and second impedance elements in a circuit relationship within said network wherein a variation in said condition results in a corresponding variation of the voltage appearing across said output terminals as a function of the algebraic difference of the condition responses of said first and second impedance elements, and a substantially constant impedance element directly connected to one of said first and second elements and reducing by a predetermined amount the contribution of said one element to said corresponding variation relative to that of the other element, whereby the linearity of the condition response of the apparatus is adjusted to the desired degree by said substantially constant impedance element.

2. Strain gage transducer apparatus having its response to load varied to a desired degree as a function of the magnitude of the load on a member so as to have a substantially linear response, comprising, in combination, an electrical network including first electrical strain gage means responsive to the load on the member and exhibiting resistance which increases non-linearly to a given extent in response to an increase of the load, second electrical strain gage means responsive to the load on the same member and exhibiting resistance which decreases non-linearly to a different extent in response to said increase of the load, said network having two input and two output terminals, a source of voltage impressed upon said input terminals, and means electrically connecting said first and second strain gage means in a circuit relationship within said network wherein a variation in the load results in a corresponding variation of the voltage appearing across said output terminals as a function of the algebraic difference of the responses of said first and second strain gage means, and a substantially constant impedance element directly connected to one of said first and second strain gage means and reducing by a predetermined amount the contribution of said one of said strain gage means to said corresponding variation relative to that of the other of said strain gage means, whereby the response of the apparatus is adjusted to be in substantially linear relationship to the load by said substantially constant impedance element.

3. Strain gage transducer apparatus as set forth in claim 2 wherein said first and second strain gage means each include a different one of first and second electrical resistance strain gages which respond differently to loads in tension and compression of the load member, wherein said substantially constant impedance element comprises an electrical resistance, and characterized in that said resistance is connected directly in parallel with the electrical gage in said one of said strain gage means.

4. Strain gage transducer apparatus as set forth in claim 3 further comprising a second substantially constant electrical resistance connected directly in series with said electrical strain gage in said one of said strain gage means.

References Cited by the Examiner

UNITED STATES PATENTS

| | | | |
|---|---|---|---|
| 1,379,266 | 5/1921 | Keeler | 324—62 |
| 1,681,047 | 8/1928 | Porter | 324—62 X |
| 2,173,233 | 9/1939 | Sieneweg. | |
| 2,565,922 | 8/1951 | Howard | 324—57 X |
| 2,625,036 | 1/1953 | Cowles | 324—57 X |
| 2,633,019 | 3/1953 | Albrecht. | |
| 2,771,579 | 11/1956 | Ruge | 324—57 X |
| 2,867,118 | 1/1959 | Cavanagh | 324—57 X |

WALTER L. CARLSON, *Primary Examiner.*

SAMUEL BERNSTEIN, *Examiner.*

A. E. RICHMOND, E. E. KUBASIEWICZ,
*Assistant Examiners.*